U​nited States Patent [19]

Baum et al.

[11] 4,435,759
[45] Mar. 6, 1984

[54] HARDWARE MONITOR FOR OBTAINING PROCESSOR SOFTWARE/HARDWARE INTERRELATIONSHIPS

[75] Inventors: Richard I. Baum, La Grange; Frederick E. Sakalay, Poughkeepsie, both of N.Y.

[73] Assignee: International Business Machines Corporation, Armonk, N.Y.

[21] Appl. No.: 273,530

[22] Filed: Jun. 15, 1981

[51] Int. Cl.³ .............................................. G06F 1/00
[52] U.S. Cl. ................................................... 364/200
[58] Field of Search ....................... 364/200 MS File; 371/17, 18, 29

[56] References Cited

U.S. PATENT DOCUMENTS 3,818,458 6/1974 Deese ................................. 364/200

OTHER PUBLICATIONS

Moore et al., "Instruction Trace Apparatus", IBM T.D.B., vol. 20, No. 9, Feb. 1978, pp. 3503-3506.

Primary Examiner—Raulfe B. Zache
Attorney, Agent, or Firm—Bernard M. Goldman

[57] ABSTRACT

The disclosure provides a hardware monitor device connectable to a large high speed processor (in a uniprocessor or multiprocessor system) to correlate software activity to hardware activity by capturing samples of instruction addresses (which are architecturally visable to the software) that cause the occurrence of the monitored activity manifested by electrical signals in processor circuit (e.g. setting of a latch), and recording the instruction addresses with a designation of the monitored event(s) (e.g. a DLAT reference or cache misses). The embodiment samples which instructions are to be captured by selecting one per N number of samplings of a specified event to be monitored. An MP embodiment makes possible the monitoring of software and/or hardware relationships between processors in a multiprocessor by connecting a monitor to each processor being monitored, and interconnecting an event capture signal generated in one processor monitor (master) to control the capture recording means in another processor monitor (slave), so that the recorded information can indicate if the instruction in one processor is responsible for an event occurring in the other processor. A personalization register in each monitor is loaded by a control processor with the identifier of the processor being monitored (PBM), the sample count value N, a designation of the particular capturable event which is to control the capture of its causative instruction address, and a designation of other events or conditions whose current state will be indicated as part of the captured data.

22 Claims, 11 Drawing Figures

FIG. 7
CORRELATION
CONTROL (CC)

FIG. 8
PERSONALIZATION REG (PSR)

FIG. 9 PING-PONG CONTROL

HARDWARE MONITOR FOR OBTAINING PROCESSOR SOFTWARE/HARDWARE INTERRELATIONSHIPS

INTRODUCTION

The subject invention relates to hardware monitors for generating measurement data on the performance characteristics of data processing systems.

BACKGROUND

Many computer performance monitoring tools have been developed in the prior art for the purpose of evaluating computer systems. Most have been conceived with different goals in mind. Some of these tools are software, some hardware; many of the hardware measurement devices require program analysis of their output, and some of the software tools require input data that is collected by one of the hardware devices.

All monitors can basically be divided into two categories; counters and recorders. The counter counts the number of occurrences of an event and the counter output usually represents some kind of meaningful information. The recorder, on the other hand, collects data about a defined event on some recording media for later processing to make the data meaningful. Most generally, the recorder is used when the event to be analyzed is of a complex nature. Tracing programs can perform the recorder type of monitoring. Early IBM counter type monitors usually monitored six mutually exclusive states in a processor, which were:

1. Total operation time,
2. Channel A operation time,
3. Channel B operation time,
4. CPU operation time, no I/O in process,
5. Tape equipment operation time, CPU in wait state.
6. Card equipment operation time, CPU in wait state.

Software monitors and tracing programs universally have the problem of distorting the processor operations which they are measuring, because they compete for some of the same system resources.

All monitoring functions also fall into two classes: those that sense hooks specially put into the code to assist a monitoring operation, and those that sense some characteristic of a program provided to perform the program's function. Hooks are special instructions inserted into the code for reasuring purposes. The monitor call (MC) instruction in the IBM System/370 architecture is provided for use as a hook in program code. For example, a hook may be put into a routine or queue, so that the number of times such hook instruction executes can be counted to determine the number of times that the routine or queue is entered by a program. A hardware monitor has been used to sense and count the occurrence of a hook instruction. Monitor functions which have been used to sense non-hook program characteristics, for example, have sensed the frequency of occurrence of specified instruction operation coded and the address distribution of requests to main storage.

Background on monitors and their use is described in a book entitled "Evaluation and Measurement Techniques for Digital Computer Systems" by M. E. Drummond, Jr. published in 1973 by Prentice-Hall, Inc., Inglewood Cliffs, N.J.

Examples of patents on data processing system hardware monitors which use counters as an output entity are represented by U.S. Pat. No. 3,399,298 to H. M. Taylor entitled "Data Processor Profitability Monitoring Apparatus"; U.S. Pat. No. 3,588,837 to R. D. Rash et al entitled "Systems Activity Monitor" and U.S. Pat. No. 4,068,304 to W. F. Beausoleil et al entitled "Storage Hierarchy Performance Monitor".

There are also hardware monitors being commercially sold such as the Comten 8028 monitor and the Tesdata monitor.

SUMMARY OF THE INVENTION

The subject invention provides a hardware monitor which can operate with a multiprocessor or uniprocessor to generate output data which is recorded for measuring the hardware and/or software operations of a data processing system. It is therefore the principle object of this invention to provide a hardware monitor which is capable of relating the occurrence of asynchronous hardware events to a causative software event, as represented by the address of the causative instruction in an instruction stream of a data processing system, which may be a multiprocessor system.

It is a further object of this invention to provide a hardware monitor which provides hardware to software correlation on a sampled basis, wherein a user may select every nth occurrence of a hardware event to capture its causative instruction address and the state at capture time of one or more other events which may be correlated with the captured event's instruction, and these events correlated with the software causing them to happen on a statistical basis.

It is a further object of this invention to provide a software correlating hardware monitor which does not distort the executing program. Therefore, the invention does not have the characteristics of software monitors which may distort the operation of the program they are monitoring with distorted monitored results.

It is a further object of this invention to provide a hardware monitor which can record output data on monitored events within a multiprocessor (MP) system, and in the recorded data relate the events occurring within different processors of the system to the instruction stream of any of the processors to enable a determination of which program in which processor caused an event in the same or a different processor in the system.

It is a further object of this invention to enable novel monitoring activities, such as: determining which instruction is the cause of a system deadlock in an MP, correlating software events occurring in plural processors of an MP, correlating hardware interactions within an MP in relation to software being performed in the different central processors comprising the MP. Characteristics monitored for single processors include being able to determine: the cache miss or hit rate for a processor, determining which instruction caused the accessing of a particular operand address, indicating the state of a processor at the time that a monitored event occurred, being able to record information indicating that the monitored information is not valid and should be ignored in determining processor operation results.

It is another object of this invention to provide a hardware monitor to capture and record data of a very high speed processor which has an instruction rate that is equal or greater than the capture and recording rate of the monitor by having the monitor sample the nth occurrence of the event. It has been found statistically that over a relatively large number of occurrences of an event being monitored that the measurement accuracy of the monitor results is virtually the same as if all occurrences of the monitored event had been captured and recorded. The result is that the monitor can monitor a processor having n times the instruction rate that a non-sampling type of monitor could handle, and with resulting economics in the choice of circuit speeds necessary to build the monitor. The choice of a minimum value for the sampling rate n is done with the use of a recording buffer overrun counter, wherein n is increased until the overrun rate is very small or zero.

It is a further object of this invention to enable data to be collected from numerous software environments, including application programs and different operating systems, without the necessity of providing special hooks or other markers or modifications into the code to disturb the code which may make more difficult the obtaining of statistical information on the operation of the code.

It is another object of this invention to provide a monitoring system which may be under control of a single external control processor for the correlated gathering of data simultaneously monitored from the different processors in a multiprocessor system, in order to study the hardware/software interactions among the different processors in the system.

The subject invention correlates software activity to hardware activity by capturing samples of instruction addresses (which are architecturally visable to the software) causing the occurrence of the monitored hardware activity manifested by electrical signals in a processor circuit (e.g. setting of a latch), and recording the instruction addresses with a designation of the monitored hardware activity (e.g. a DLAT reference or cache misses). The invention makes possible the monitoring of software and/or hardware relationships between processors in a multiprocessor by connecting a monitor to each processor being monitored, and interconnecting an event capture signal generated in one processor monitor (master) to control the capture recording means in another processor monitor (slave), so that the recorded information can indicate if the instruction in one processor is responsible for the event occurring in the other processor. This MP monitor connection requires that the event sampling function be whenever it receives an event capture signal from the master monitor. In this manner, monitor can be made the master and any monitor can be made the slave according to the processor interrelationship being monitored. The MP monitoring requires a sequenced outputting of the captured data in the plural monitors of the MP, which is done under control of a control processor that records the captured data with a designated sequence. The output sequencing with the monitored processor identifier in the data items enables the MP interrelationships to be determined. Thus, the subject invention enables a monitor to determine uniprocessor characteristics such as operand reference rate, and cache reference rate, and to determine multiprocessor characteristics such as interprocessor cache cross-interrogation behavior and interprocessor deadlock causes.

At the beginning of a monitor data collection operation, a personalization register in each monitor is loaded by the control processor with the identifier of the processor being monitored (PBM), the sample count value N, a designation of the particular hardware event in PBM which is the capturable event which is to control the capture of its causative instruction address, and second event designation of an event or condition whose current state will be indicated as part of the captured data. The values loaded into the personalization register are provided by the user in a program in the control processor which loads the register.

Then a sampling counter is set to that sampling value N to control the sampling rate of the designated capture event; N may be set to any value from 1 to a large number such as 1,000,000. If N is set to 1, every occurrence of the designated capture event is being monitored. For example, if N is set to 1,000 then only every thousandth occurrence of the event is monitored.

A cross-bar type of switch is provided to enable selection of the capturable event designated by the personalization register among plural capturable signals provided by PBM to the monitor. The output of this switch drives the sampling counter.

A second cross-bar type of switch is controlled by the second event designation from the personalization register to select the second event from the plurality of signals provided by PBM to the monitor.

A correlation control receives PBM signals indicating the occurrence of the selected capturable event, receives the address of each instruction executing in the PBM from the PBM instruction address register, and receives the sampling count signals from which a capture signal is generated to indicate the occurrence of each Nth capturable event, which will correlate with the instruction in the program causing the Nth capturable event.

A capture register is enabled by the capture signal to store the address of the instruction which caused the event, along with the states of other selected signals existing at the time of capture. Also, the PBM identifier, and designators of the captured event and any selected additional event are also stored in the capture register at the time of capture to enhance the information content of the captured data, which is transferred to a FIFO output buffer.

The control processor reads the data in the output buffer in the order the data is generated, and the control processor may store the data on an I/O device. The control processor readout rate from the monitor is coordinated with the monitor sampling rate N, when it is desired to use the lowest sampling rate N consistent with accurate PBM performance data.

These and other objects, features and advantages of the invention may be more fully understood and appreciated by considering the following detailed description in association with the accompanying drawings.

DETAILED DESCRIPTION OF THE PREFERRED EMBODIMENTS

Figure 1:
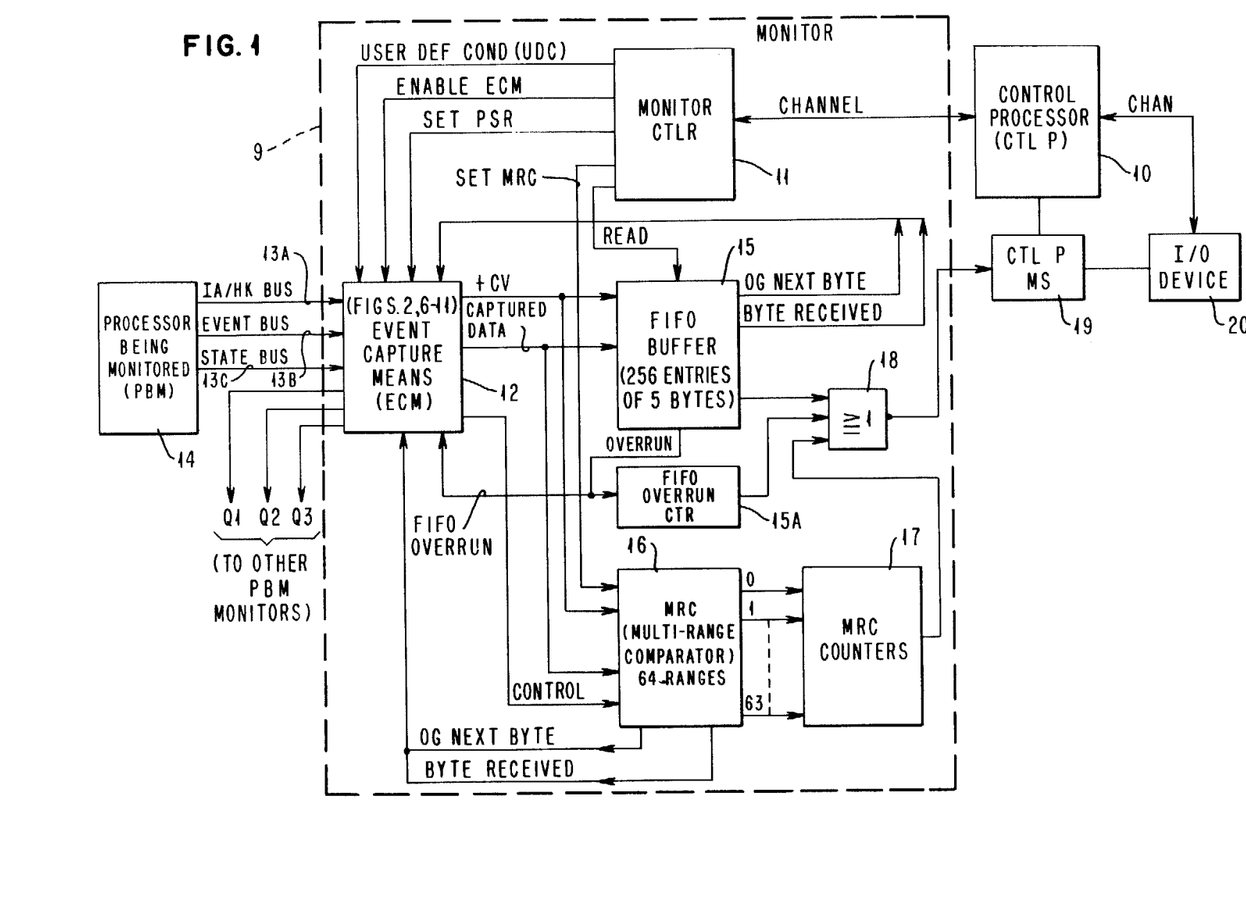
FIG. 1 shows a general block diagram of a monitor containing the subject invention and its connections between a processor being monitored (PBM) and a control processor (CNT P) which controls the operation of the monitor.

FIG. 1 illustrates the manner in which a monitor 9 containing the subject invention can be connected to a processor 14 being monitored (PBM), and the manner in which monitor 9 is connected to a control processor (CNT P) 10. Control monitor 9 controls which events are monitored in PBM and receives the data captured by monitor 9 in its main storage 19, from which the control processor can output the data onto an I/O device 20, e.g. tape or disk.

Figure 3:
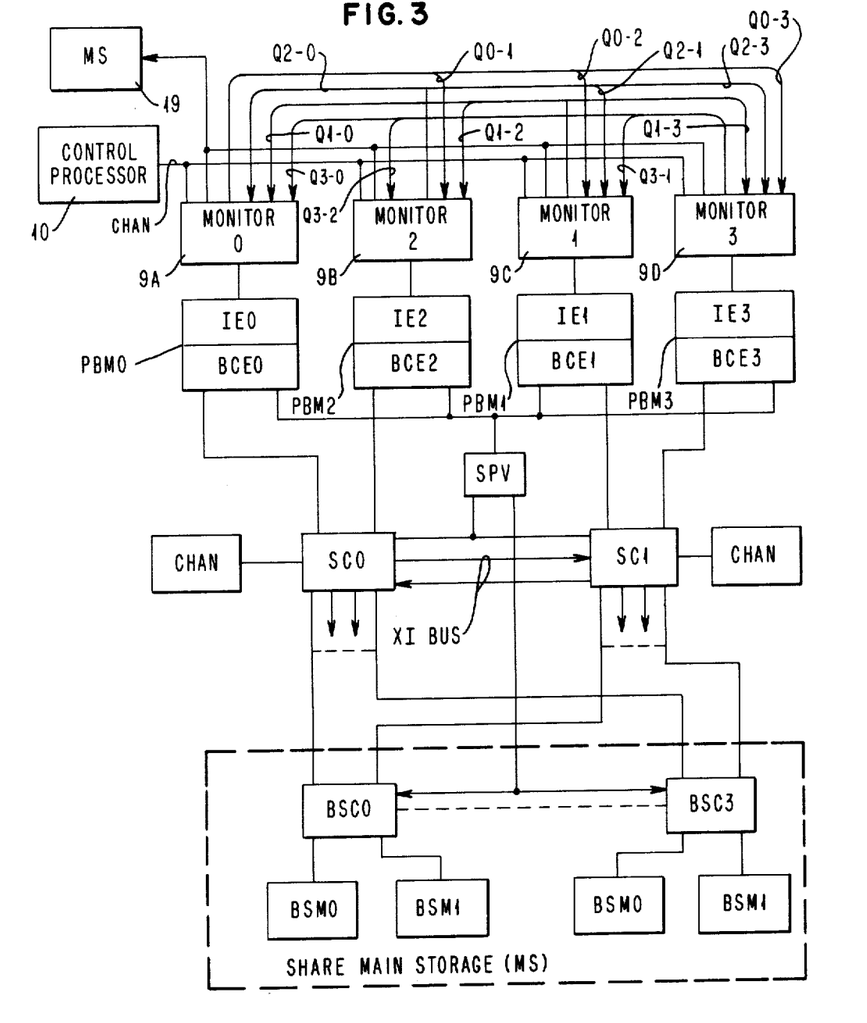
FIG. 3 illustrates a preferred embodiment of the invention involving a plurality of monitors connected to respective processors being monitored in a multiprocessor (MP) system.

FIG. 3 illustrates the manner in which the invention monitors a multiprocessor (MP) system. It includes a plurality of monitors 9 respectively connected to the central processors being monitored (PBM0–PBM3). Monitors 9 are interconnected in a special way by lines Q to be able to detect which events in any PBM may have been caused by operation of another PBM and to identify the causative instruction in the other PBM. An MP having up to four PMBs (i.e. CP0, CP1, CP2 and CP3) is disclosed and claimed in U.S. patent application Ser. No. 205,500 filed on Nov. 10, 1980, by F. O. Flusche et al and assigned to the same assignee as the subject application.

A single control processor (Ctl. P) 10 controls the operation of all monitors 9-0 through 9-3 of the MP system. Control processor 10 issues control commands on a single channel which is connected to each of the four monitors 9-0, 9-1, 9-2 and 9-3 which appear as I/O devices to control processor 10. The control processor issues sequential read commands to the four monitors so that simultaneously captured data is outputted to the channel as a related group containing the predetermined sequence of captured data from the four monitors, and the group is stored in the main storage (MS) 19 of processor 10, from which the data can be transferred to an I/O device, e.g. tape or disk if required.

It is therefore apparent that the invention has special MP monitoring features, but it can also monitor a uniprocessor.

As shown in FIG. 1, each monitor 9 contains a monitor controller 11 which connects monitor 9 to a channel of the control processor 10, an event capture means (ECM) 12 which is connected to the PBM and captures monitored data in five byte units, a FIFO (first-in, first-out) buffer 15 which receives each five byte captured data unit immediately after it is captured, a FIFO overrun counter 15A which detects each time an event was not captured when it should have been captured, and a multirange comparator (MRC) 16 and its counters 17 which counts the number of times that captured events fall into respective predetermined address ranges. This invention is primarily concerned with ECM 12, FIFO buffer 15 and FIFO overrun counter 15A and not with MRC16 and its counters 17.

An OR circuit 18 connects the output data provided by the FIFO buffer 15, FIFO overrun counter 15A, or MRC counters 17 to the main storage (MS) 19 of the control processor 10 in response to an appropriate read command from processor 10 to monitor controller 15.

The monitor controller 11 acts as an I/O control unit to decode each channel command sent to the monitor by control processor 10. Among the available channel commands are: (1) enable monitor, (2) set PSR (personalization register), clear and read FIFO buffer, read FIFO buffers, read counters, user defined condition (UDC), etc.

The enable monitor command enables the addressed monitor to operate. The set PSR command loads a personalization register in the monitor with data for initializing a particular monitoring operation, i.e. which event will be captured, its sampling rate, other event(s) to be simultaneously monitored, etc. The clear and read FIFO buffer command first clears a first-in, first-out (FIFO) buffer 15 and sets the FIFO readin and readout points to FIFO location zero; and as FIFO buffer 15 receives captured data in 5 byte groups they are readout a byte at a time to the control processor main storage (MS) 19. The read port of the command is active for the entire measurement operation. On the other hand the read FIFO buffer command reads out the next five byte units of captured data in the FIFO buffer 15 to MS 19 at the current FIFO readout pointer setting and increments the setting by one after the captured data unit is readout. The UDC command sets up the inputs to monitor 9 according to boolean conditions defined in the command to control the monitoring operation during the monitoring run. (The UDC command is not part of the subject invention.)

Figure 2:
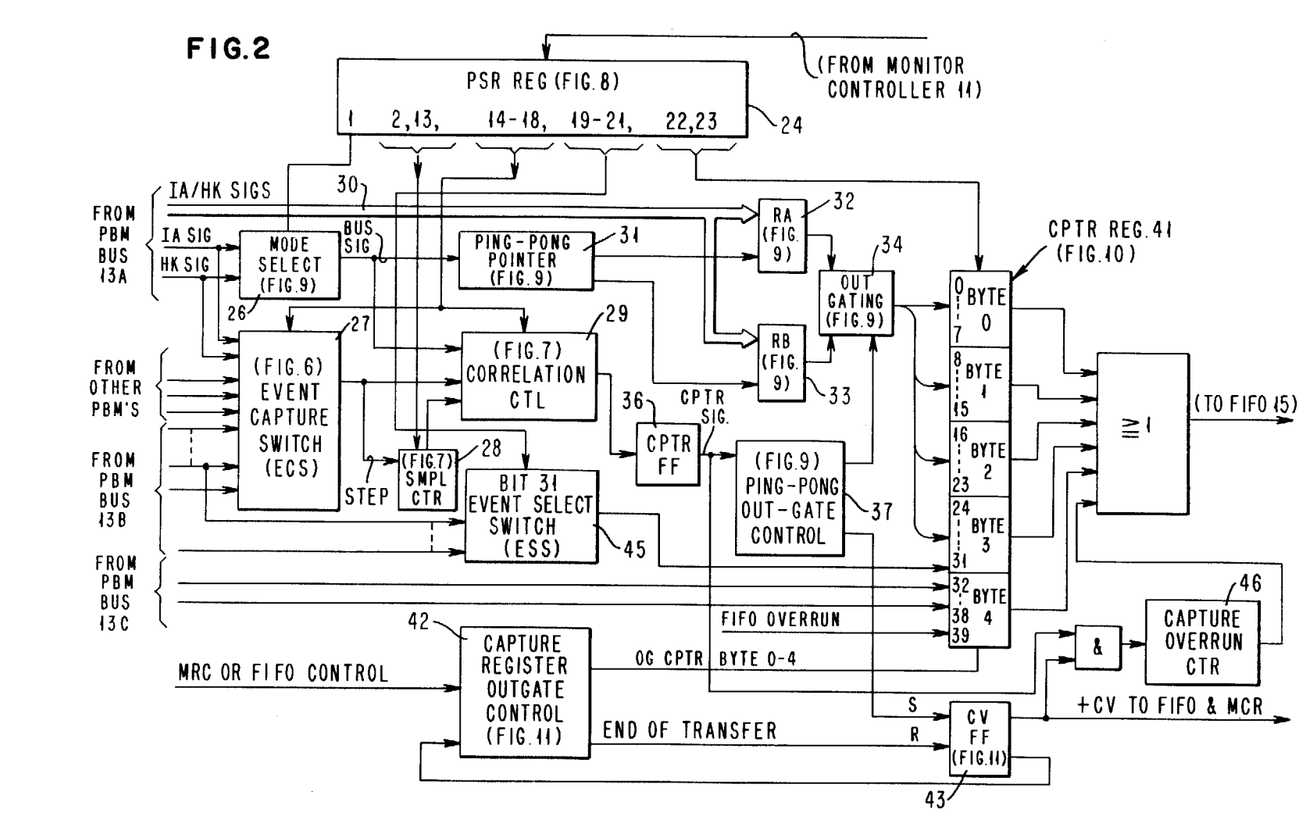
FIG. 2 is a general block diagram of the internal circuit arrangement within a preferred embodiment of the subject invention.
Figure 8:
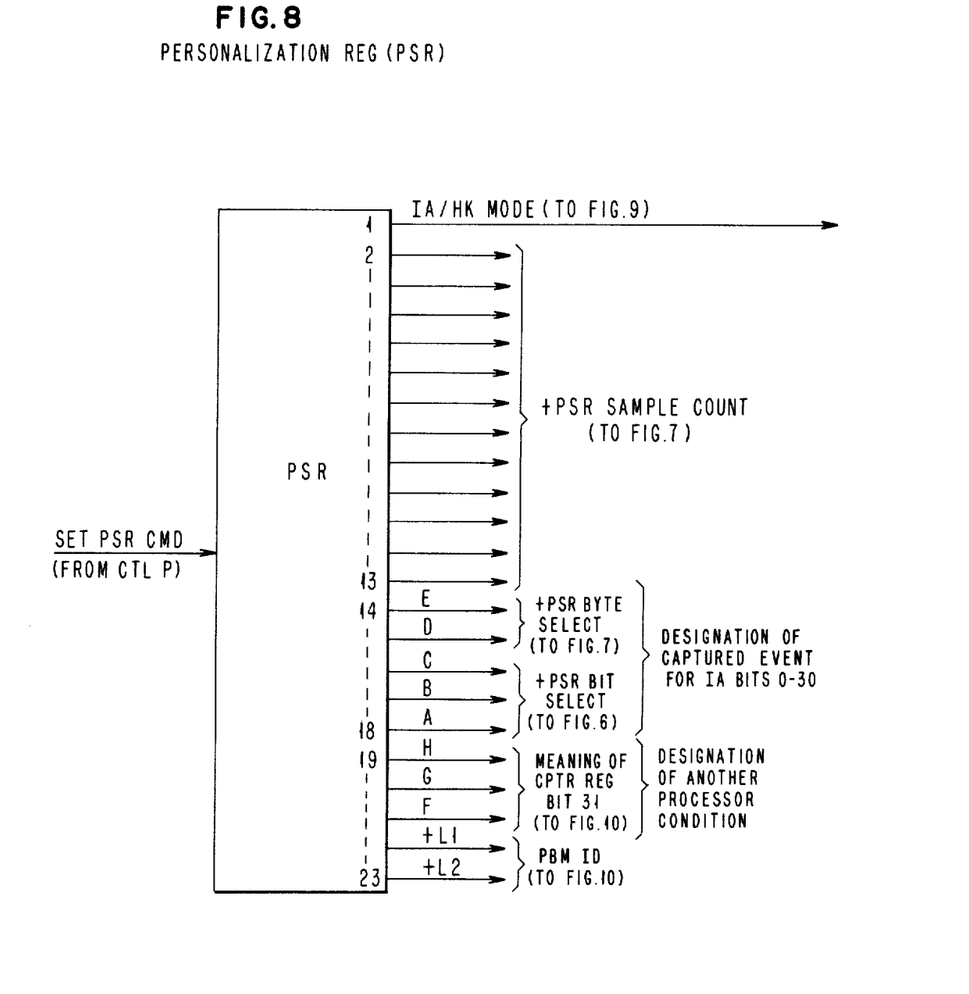

FIG. 2 illustrates a block diagram of the circuit contents in ECM 12 shown in FIG. 1. ECM 12 is initialized for a performance measurement of the PBM by a set PSR command loading the fields in a personalization register (PSR) 24, which is shown in detail in FIG. 8. The set PSR command loads:

(1) PSR bit position 1 to select the mode of operation for monitor 9 as either the instruction address (IA) mode, or the hook (HK) mode. (The invention claimed in this specification relates to the IA mode of operation.)

(2) PSR bit positions 2-13 receive a sample count number N.

(3) PSR bit positions 14-18 (labeled A-E) select the capturable event.

(4) PSR bit positions 19-21 (labeled FGH) select an additional event whose state is captured whenever the capturable event is captured and may be for an event other than the capturable event; and (5) PSR bit positions 21 and 22 (labeled L1 and L2) identify the processor being monitored.

The capturable event may occur asynchronously in relation to time. When in IA mode, ECM 12 relates the occurrence of the capturable event to the instruction causing the event by generating a trigger signal to capture the associated IA value when that event happens.

Upon the occurrence of each Nth capturable event, ECM 12 captures the then current instruction address, a signal indicating the on or off state at capture time of an additional event specified by PSR bits FGH, and an additional byte including the status of PBM at the time of capture. The captured data in this embodiment comprises four bytes for the instruction address and additional event state, and a fifth byte containing PBM status data and an indication if the FIFO buffer is then in an overrun state. If the FIFO buffer is not in an overrun state, the captured five byte data units are immediately outputted to the FIFO buffer 15 from which the captured data unit is transferred to MS 19 under a read command from the control processor 10. If the control processor cannot take the data unit from buffer 15 before the next unit is captured, the captured units are collected in buffer 15 until called for by processor 10. If FIFO buffer 15 should become full, it generates an overrun signal which prevents buffer 15 from receiving any more captured data until at least one byte is readout, which allows a byte to be received from the capture register 41 in the readout byte location. While any overrun exists, each captured data unit instead increments the FIFO overrun counter 15A.

As shown in FIG. 1, monitor 9 is connected to busses 13 from PBM. The set of signals on bus 13A represent either an instruction address (IA) or a hook (HK) as indicated by a pulse on an IA signal line or a HK signal line in bus 13A. An event bus 13B and a state bus 13C each have respective lines which connect to various latches and circuits in PBM to sense the occurrence of respective events or states in PBM. The monitor will capture certain sets of signals on bus 13A because of the occurrence of a specified event on bus 13B during program execution by PBM.

Figure 9:
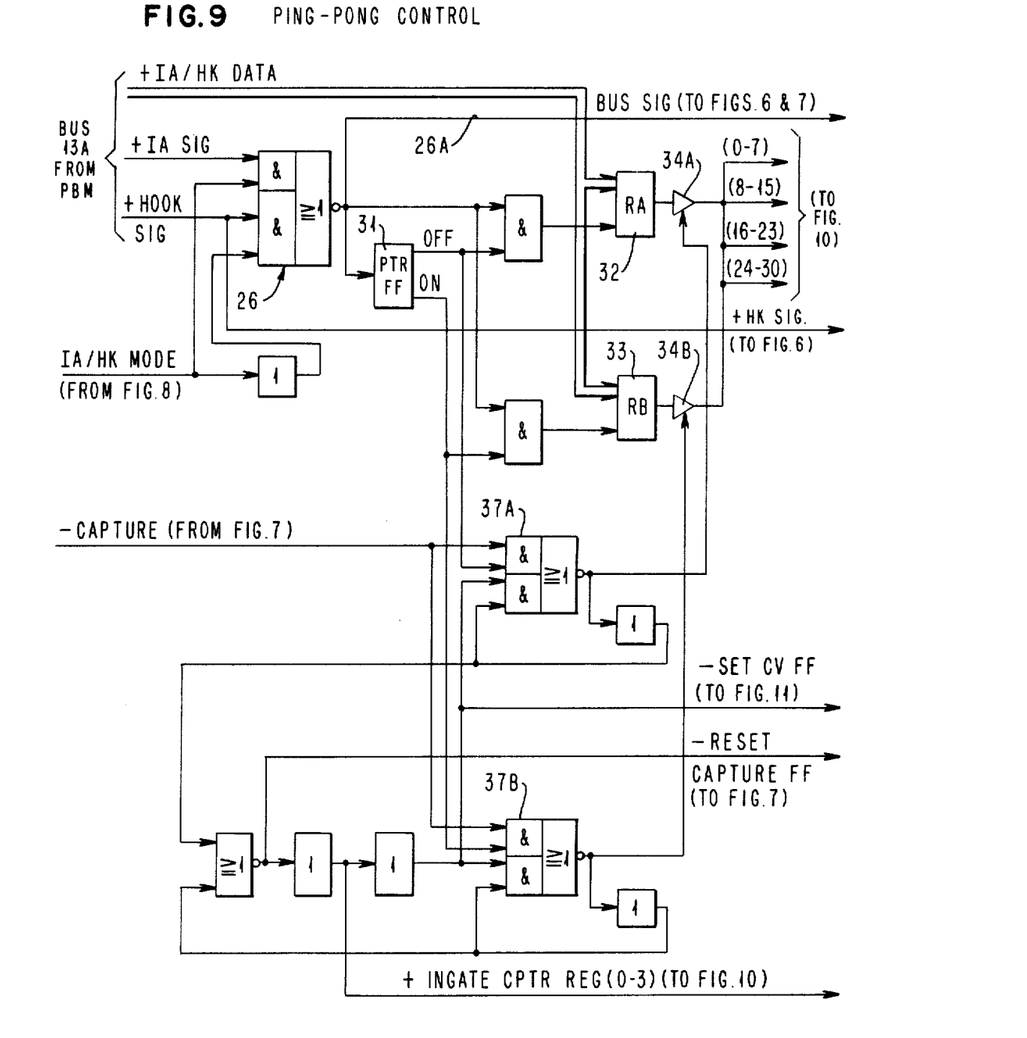

The monitors IA or HK operating mode is determined by the one or zero output of PSR bit position 1 to a mode select circuit 26. As shown in detail in FIG. 9, a selected IA signal or hook signal generates a bus signal on line 26A. A sequence of signals on line 26A sets a pointer flip-flop 31 to alternate its on and off outputs. Registers RA 32 and RB 33 therefore alternately receive the content of IA/HK bus 13A from the PBM in a ping-pong manner under control of the alternating outputs of pointer flip-flop 31.

Busses 13 comprise lines which receive the event signals from PBM listed in the following TABLE 1:

TABLE 1

| 1  | + | Storage Hang |
| 2  | + | Reserved |
| 3  | + | DLAT Reference |
| 4  | + | Cache Reference |
| 5  | + | I-Fetch Miss |
| 6  | + | XI Castout |
| 7  | + | DLAT Miss |
| 8  | + | Operand Fetch |
| 9  | + | Operand Store |
| 10 | + | Cache Miss |
| 11 | + | XI Hit |
| 12 | + | Any Castout |
| 13 | + | Logical Address Compare |
| 14 | + | I-Fetch (Instruction Address Valid) |
| 15 |   |   |
| 16 | + | Clock Stopped |
| 17 | + | Manual |
| 18 | + | Wait |
| 19 | + | Problem State |
| 20 | + | Clock (10MNZ) |

In FIG. 2, an event capture switch (ECS) 27 receives inputs from bus 13B and also may receive capture signals Q1, Q2 and/or Q3 from other monitors if this monitor Q0 is connected in an MP. ECS 27 is a crosspoint type of switch which can select any of its input signals as its output signal. PSR bits 14–18 (designated ABCDE) are provided to ECS 27 to select one of the inputs as the capturable signal representing the capturable event. The following TABLE 2 lists the capturable events:

TABLE 2

| PSR Field | | | | | |
|---|---|---|---|---|---|
| E | D | C | B | A | Capturable Event |
| 0 | 0 | 0 | 0 | 0 | Capture for any remote monitor Q1 + Q2 + Q3 |
| 0 | 0 | 0 | 0 | 1 | Capture for remote monitor Q1 |
| 0 | 0 | 0 | 1 | 0 | Capture for Remote Monitor Q2 |
| 0 | 0 | 0 | 1 | 1 | Capture for Remote Monitor Q3 |
| 0 | 0 | 0 | 0 | 0 | Storage Hang |
| 0 | 0 | 0 | 0 | 1 | HOOK Valid |
| 0 | 0 | 0 | 1 | 0 | Reserved |
| 0 | 0 | 0 | 1 | 1 | IA Valid |

TABLE 2-continued

| PSR Field | | | | | |
|---|---|---|---|---|---|
| E | D | C | B | A | Capturable Event |
| 0 | 0 | 0 | 0 | 0 | DLAT Reference |
| 0 | 0 | 0 | 0 | 1 | Cache Reference |
| 0 | 0 | 0 | 1 | 0 | I Fetch Miss |
| 0 | 0 | 0 | 1 | 1 | XI Castout |
| 0 | 0 | 0 | 0 | 0 | DLAT Miss |
| 0 | 0 | 0 | 0 | 1 | Operand Fetch or Operand Store |
| 0 | 0 | 0 | 1 | 0 | Clock 10 MHz |
| 0 | 0 | 0 | 1 | 1 | Cache Miss |
| 0 | 0 | 0 | 0 | 0 | XI Hit |
| 0 | 0 | 0 | 0 | 1 | Any Castout |
| 0 | 0 | 0 | 1 | 0 | Logical Address Compare |
| 0 | 0 | 0 | 1 | 1 | I Fetch |
| 0 | 0 | 0 | 0 | 0 | Reserved |
| 0 | 0 | 0 | 0 | 1 | Reserved |
| 0 | 0 | 0 | 1 | 0 | Reserved |
| 0 | 0 | 0 | 1 | 1 | Reserved |

Figure 7:
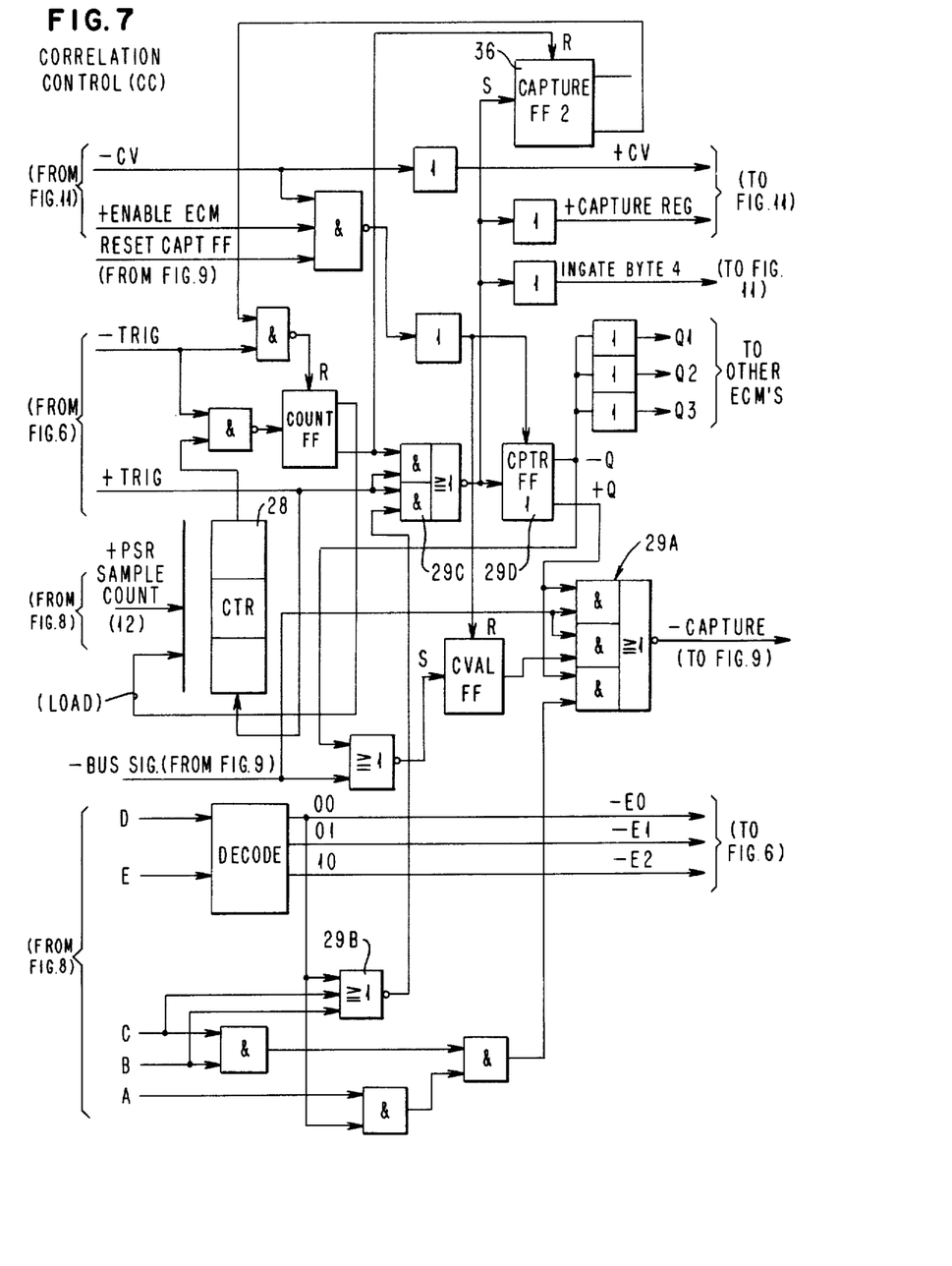
Figure 10:
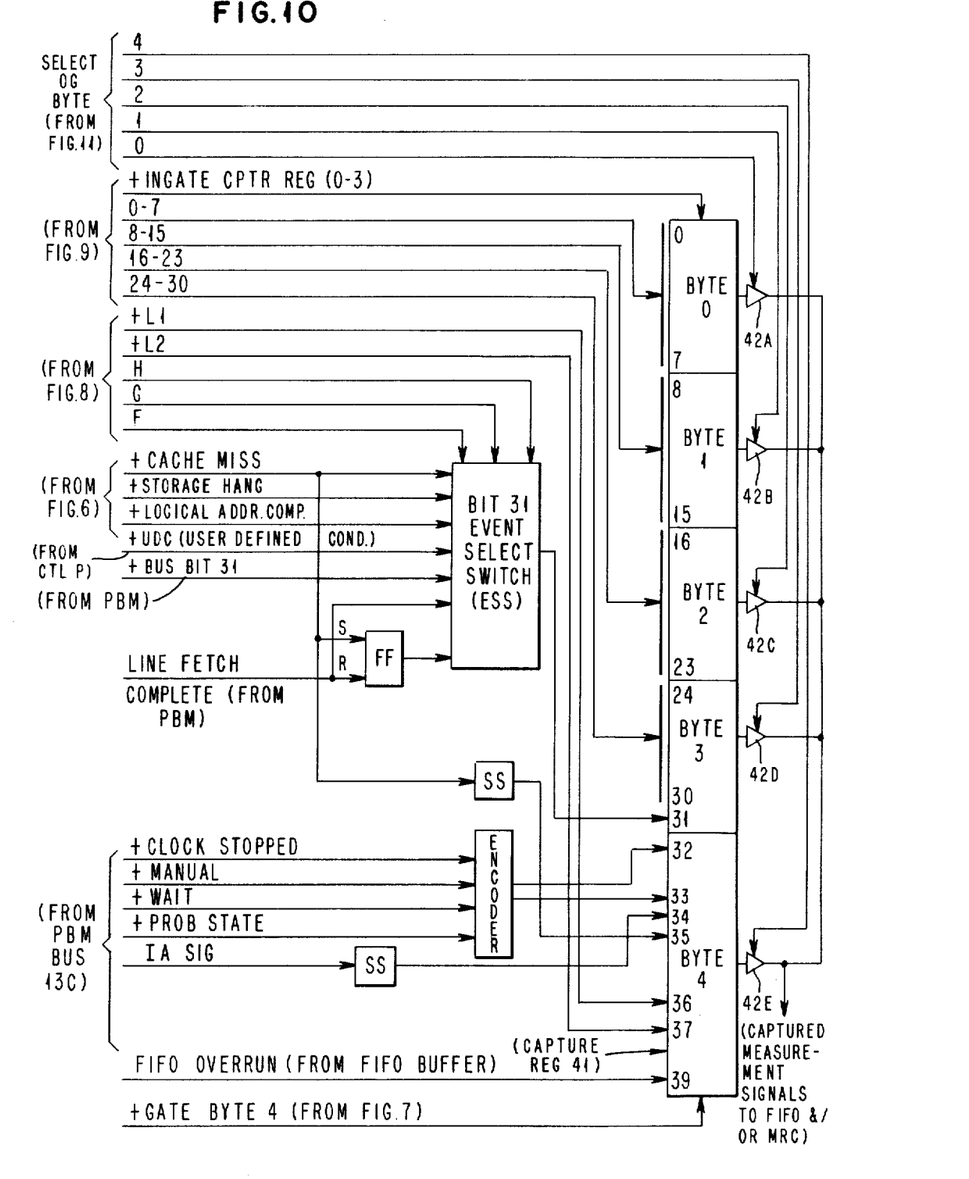
Figure 11:
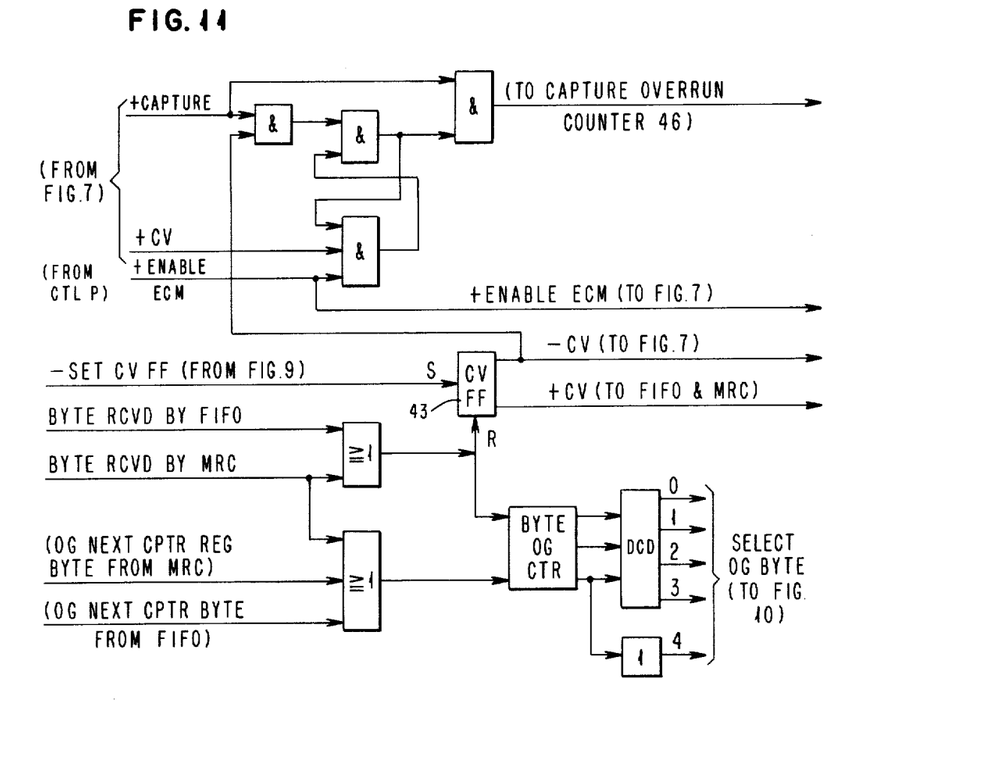

Each occurrence of the selected capturable event causes a trigger signal at the output of ECS 27 which is provided to the input of a sample counter 28 and to a correlation control 29 shown in detail in FIG. 7. The sampling counter 28 may be a 12-bit count-up counter. It controls the frequency of capture known as sampling rate N. Counter 28 is incremented by 1 each time ECS 27 outputs a trigger signal. The trigger signal following the sampling counter overflow will signal the correlation control 29 to capture the current instruction address and load it into a capture register 41. The number of trigger signals between captures is specified by N, which may be any value from 1 to 4095. Each Nth trigger signal outputted by ECS 27 causes the sampling counter 28 to overflow and generate a capture signal in circuit 29A which is sent to circuits 37A and 37B in FIG. 9 which outgate the register RA or RB containing the address of the current instruction causing the selected event. The instruction address is transferred into bit positions 0–30 in capture register 41 in FIG. 10.

However, any of a special set of events, if selected for capture, will bypass the operation of sampling counter 28 and cause a capture of the IA in register 41 on every occurrence. These special events are the first six events listed in TABLE 2. The remaining events in TABLE 2 are controlled by the operation of sampling counter 28. In FIG. 7, the PSR bits A–E are received, and the codes for the bypassed special events are sensed in circuits 29B, etc., to control the bypassing of the trigger signals via circuit 29C to activate capture flip-flops 29C and 29D which generates a capture signal that is passed through circuit 29A to control the outgating of the current IA from RA or RB to capture register 41 in FIG. 10.

Whenever a capture signal ingates an IA into capture register 41, the states of an additional event selected by a bit 31 event select switch 45 may also be captured in register 41 with the IA. At the same time, certain PBM states on bus 13C are loaded into the fifth byte (byte 4, bits 32–35) in capture register 41. Also the PBM indentifier L1, L2 is loaded into byte 4, bits 36, 37 from the PSR. The bits of the fifth byte are specified in the following TABLE 3:

TABLE 3

| Byte 4 Bit Position | Designated State |
|---|---|
| 32,33 | 00 = PBM clock stopped, or manual, or wait |
|  | 01 = PBM in wait state |
|  | 10 = PBM running in Supervisor state |

TABLE 3-continued

| Byte 4 Bit Position | Designated State |
|---|---|
|  | 11 = PBM running in Problem state |
| 34 | IA Valid |
| 35 | Cache Miss |
| 36,37 = PSE bits 22,23 = PBM ID | 00 = PBM 0 |
|  | 01 = PBM 1 |
|  | 10 = PBM 2 |
|  | 11 = PBM 3 |
| 38 | Captured Sample not Invalid Due to channel timeout |
| 39 | FIFO buffer overrun |

In IA mode, bit position 31 is not needed for containing the IA and is used to represent the state of the additional event selected by ESS 45, because in an IBM S/370 architecture, bit 31 is not used to address instructions in the main storage since the shortest instruction is one-half word long and is addressed on one-half word boundaries (i.e. bit 30). Although bit position 31 on IA bus 30 is never used in IA mode, bit 31 may be used in hook mode. Therefore, in IA mode, position 31 in capture register 41 is used to record the state of the event selected by ESS 45 at each capture time, and bit 31 may represent the state of any event selected by PSR bits FGH in the following TABLE 4:

TABLE 4

| (PSR Event Meaning For Capt. Reg. Bit 31) | | | |
|---|---|---|---|
| PSR Field | | | |
| H | G | F | Designated Event |
| 0 | 0 | 0 | Reserved |
| 0 | 0 | 1 | Cache Miss |
| 0 | 1 | 0 | Storage Hang |
| 0 | 1 | 1 | Logical Address Compare |
| 1 | 0 | 0 | UDC |
| 1 | 0 | 1 | Bit 31 |
| 1 | 1 | 0 | Reserved |
| 1 | 1 | 1 | Line Fetch Active |

ESS 45 also is a crosspoint type of switch. The combinatorial state of bits FGH selects one of the PBM inputs to ESS 45 as its output to bit position 31 in register 41. Therefore, bit position 31 in register 41 may be either one or zero with a captured IA.

Once the content of RA or RB is transferred to capture register 41, the capture is complete and a capture valid (CV) flip/flop 43 is set. The CV signals the FIFO buffer 15 that byte 0 is being outputted from capture register 41 to buffer 15. A return signal from FIFO is provided to an outgate control 42 to cause the next captured byte to be outgated from register 47. This sequence is repeated until all five bytes are transferred to the FIFO buffer. At the end of the fifth byte transfer, CV flip flop 43 is reset. Register 43 is now ready to capture another instruction address.

While register 41 is busy outgating its contents, the sampling counter 28 continues counting trigger pulses received from ECS 27. If sampling counter 28 overflows while the capture register 41 is outgating, sampling counter 28 is again loaded from the PSR with its count value; but instead of an IA capture occuring on such overflow, a capture overrun signal is raised to increment a capture overrun counter 46. The maximum rate at which the captures can occur is dependent on the execution rate of the PBM; the faster its execution rate, the sooner the next capture can occur.

Figure 4:
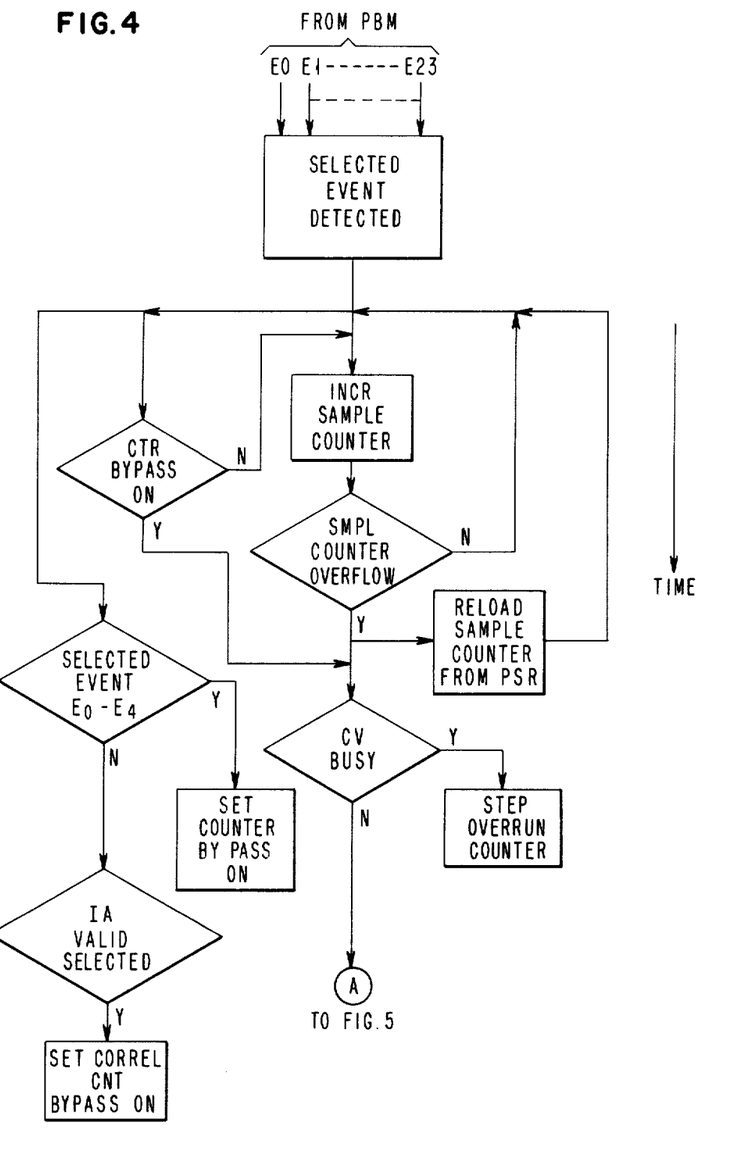
FIGS. 4 and 5 are flow diagrams illustrating a summary of the operation of the invention.
Figure 5:
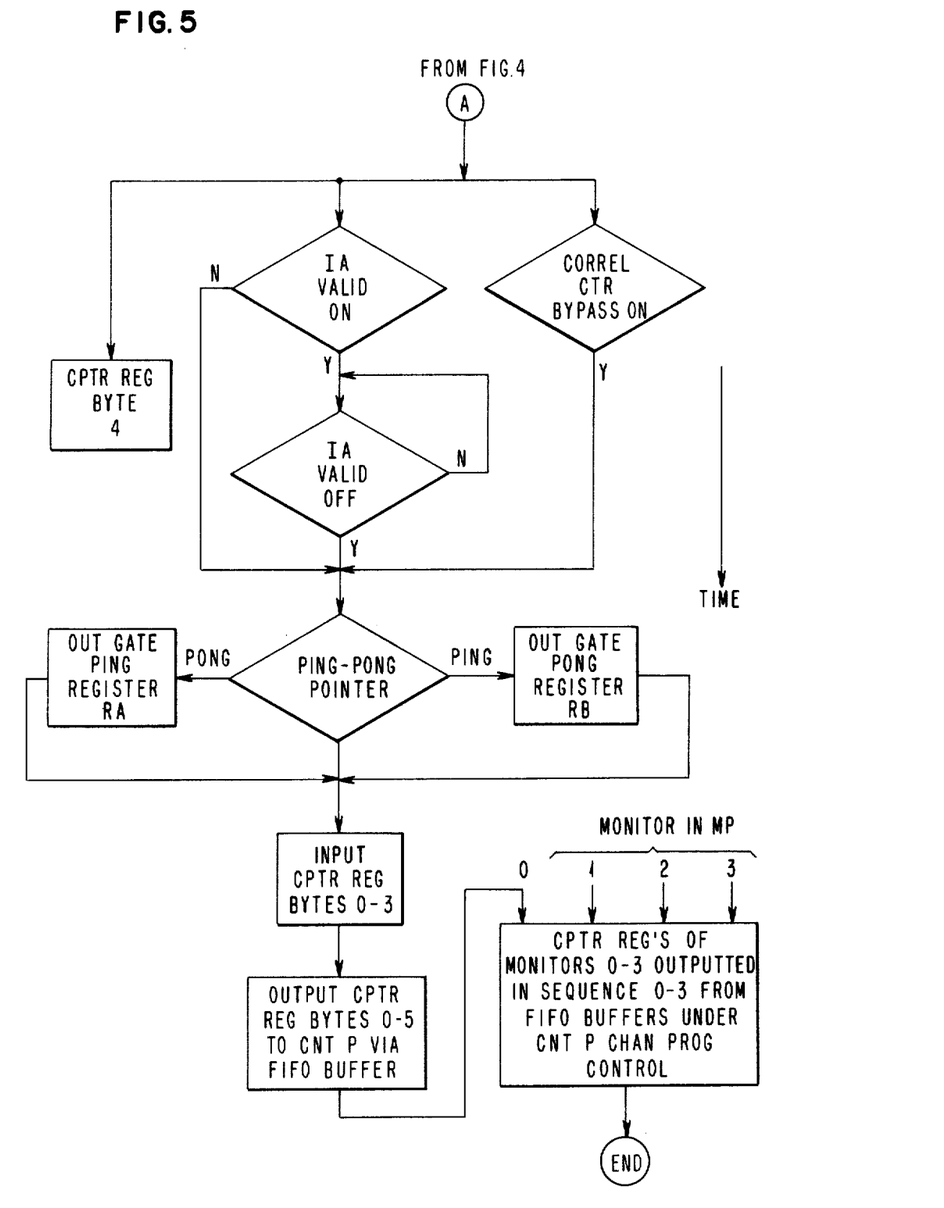
Figure 6:
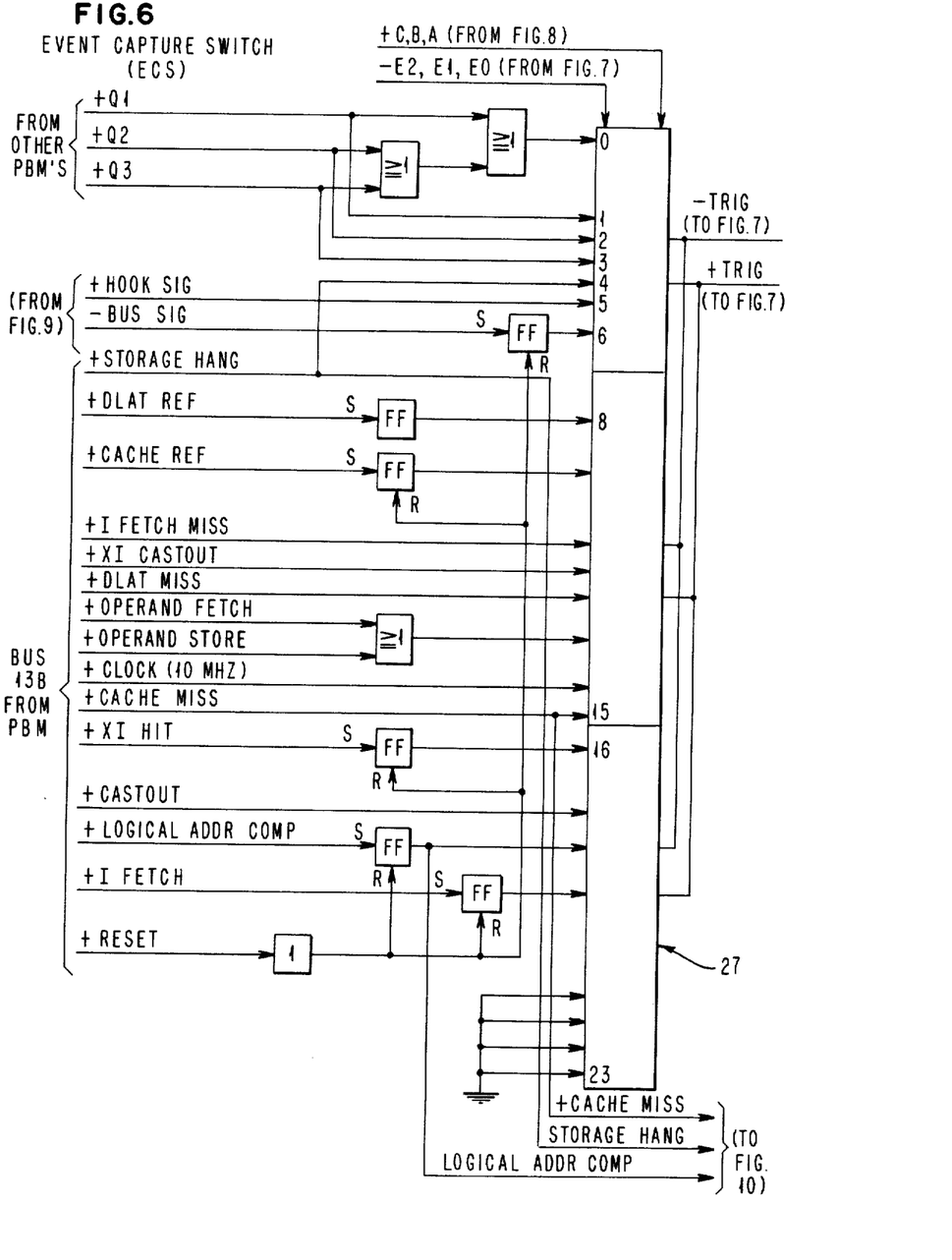
FIGS. 6 through 11 illustrate detailed circuit diagrams used in the preferred embodiment.

The monitor operation is summarized by the flow diagrams shown in FIGS. 4 and 5.

In view of the preceding description, the detailed hardware logic diagrams of the preferred embodiment of this invention shown in FIGS. 6 through 11 will be understood by anyone skilled in the art of making and using related types of machines.

While the invention has been particularly shown and described with references to a preferred embodiment thereof, it will be understood by those skilled in the art that the foregoing and other changes in form and details may be made therein without departing from the spirit and scope of the invention.

Having thus described our invention, what we claim as new and desire to secure by Letters Patent is:

1. A monitor for obtaining measurement data on the software/hardware operation of a data processing system having a processor and a main storage, the processor having an instruction unit with an instruction address register for indicating the address of each instruction being executed by the processor, the processor having latches for registering the occurrence of events in the processor resulting from its execution of an instruction; the monitor comprising:

an event capture switch having a plurality of inputs connected to a set of latches of the processor to be monitored, some of the latches being activated aperiodically in time, means for presetting the event capture switch to select one of its inputs (representing a preset type of event) as its output, the occurrence of an output signal from the event capture switch being a trigger signal, capture register means, means for capturing current input signals by connecting an output of the instruction address register to the capture register means upon an occurrence of the trigger signal to store an instruction address then being provided by the instruction address register as the address of the instruction causing the trigger signal, whereby a software operation in the system is related to a hardware operation in the system by the monitor selecting only the addresses of instructions in executing software causing the occurrence of predetermined types of hardware event to provide a required set of captured addresses.

2. A monitor for obtaining software/hardware interrelationships, as defined in claim 1, the capturing means further comprising:

sampling counter means for providing an output signal whenever a count of n is reached, an input to the sampling counter means receiving each trigger signal from the event capture switch, correlation means receiving the sampling counter means output signal and providing therefrom a capture signal to enable the capture register means to capture the instruction address associated with each nth occurrence of a monitored event causing the trigger signal, whereby over a large number of occurrences of the present event the monitored data maintains a statistical sampling ratio of n to one for the monitored data in relation to all data which would have been obtained if all occurrences of the preset event were captured.

3. A monitor for obtaining software/hardware interrelationships as defined in claim 2, further comprising:

means for connecting a latch in the data processing system to a bit position in a field in the capture register means, the latch being permitted to be included in the set of latches in the data processing system, whereby upon an occurrence of the preset type of event selected from the set of latches for capturing an instruction address, the field in the capture register means can also relate the existence or non-existence of an event signalled by the latch.

4. A monitor for obtaining software/hardware interrelationships as defined in claim 2, further comprising:

means for connecting a group of latches in the data processing system to a field in the capture register means, the group of latches being permitted to overlap in part or whole the set of latches in the data processing system, whereby upon an occurrence of the preset type of event selected from the set of latches for capturing an instruction address, the field in the capture register means can also relate the existence or non-existence of an event signalled by the group of latches.

5. A monitor for obtaining software/hardware interrelationships as defined in claim 4, the connecting means further comprising:

an event select switch having a plurality of inputs connected to a subset of the latches in the data processing means, the output of the event select switch being connected to a subset bit position in the field, the occurrence of a signal from the output being a subset event signal, means for presetting the event select switch to select one of its inputs as its output, whereby the field in the capture register means captures the state of a subset event signal at the time of capture of an instruction address due to the occurrence of a monitored event.

6. A monitor for obtaining software/hardware interrelationships as defined in claim 4, the connecting means further comprising:

encoder means having a plurality of inputs connected to a plurality of the latches in the data processing system respectively indicating a plurality of states in the system, an output of the encoder means connected to a subset of bit positions in the field in the capture register means, the output being a combinatorial indication of the states of the input signals to the encoder means, whereby the field in the capture register means captures the state of the plurality of events at the time of capture of an instruction address due to the occurrence of a monitored event.

7. A monitor for obtaining software/hardware interrelationships as defined in claim 4, the connecting means further comprising:

means for transferring signals from one or more of the latches to a corresponding bit position in the field, an event select switch having a plurality of inputs connected to a subset of the latches in the data processing means, the output of the event select switch being connected to a subset bit position in the field, the occurrence of a signal from the output being a subset event signal, means for presetting the event select switch to select one of its inputs as its output, encoder means having a plurality of inputs connected to a plurality of the latches in the data processing system respectively indicating a plurality of states in the system, an output of the encoder means connected to a subset of bit positions in the field in the capture register means, the output of the encoder means being a combinatorial indication of the states of the input signals to the encoder means, whereby the field in the capture register means captures the state of the plurality of events at the time of capture of an instruction address due to the occurrence of a monitored event.

8. A monitor for obtaining software/hardware interrelationships as defined in claim 4, further comprising:

a timing signal being the preset event, the capture register means being triggered on the occurrence of each nth timing signal as determined by the sampling counter means to capture the address of the instruction executing at the time of occurrence of each nth preset event, an event select switch having inputs connected to the group of latches in the data processing system, the event select switch outputting a preselected input as its output upon each occurrence of the event represented by the preselected input, a field in the capture register means being connected to the output of the event select switch to register the existence or non-existence of the preselected event upon each capture of an instruction address in the capture registering means, whereby the addresses captured by the capture register means over a period of time is a function of the rate of occurrence of the preset event, and the captured indications of the preselected event is a function of the proportion of occurrence of the preselected event within the rate of occurrence of the preset event.

9. A monitor for obtaining software/hardware interrelationships as defined in claim 1, the presetting means further comprising:

personalization registering means having a field for receiving a trigger event value, and switch means receiving the trigger event value to select which input of the event capture switch provides its output to generate the trigger signal, whereby the trigger event value controls the capture operations by the capture register means.

10. A monitor for obtaining software/hardware interrelationships as defined in claim 2, the presetting means further comprising personalization registering means including:

a first field for receiving a trigger event value that selects which input of the event capture switch provides the switch output trigger signal, a sample count field for receiving a sample count value that determines the sampling rate for event capture by the monitor, means for loading the value initially loaded into the sample count field into the sample counter means, means for incrementing or decrementing the sample counter means with each trigger signal, means for gating the current instruction address into the capture register means in response to a sample counter means reaching a given value to output a capture signal, the loading means reloading the sample counter means in response to the sample counter means providing a capture signal, whereby the capture sampling rate is determined by the sample count value.

11. A monitor for obtaining software/hardware interrelationships as defined in claim 10, the personalization registering means further comprising:

a processor identifier field in the personalization registering means for initially receiving an identifier of the processor to be monitored, the gating means also transferring the processor identifier from the processor identifier field into a field in the capture registering means for each provided capture signal, whereby data obtained from the capture register means identifies each processor being monitored.

12. A monitor for obtaining software/hardware interrelationships as defined in claim 11, further comprising:

a monitor bus having event lines respectively connected to the latches in the processor and address lines connected to the instruction address register in the processor, an address valid line also being included in the monitor bus for signalling when the monitor bus is transmitting valid address from the instruction address register, first and second registers for alternately receiving instruction addresses, first and second input gates having inputs connected to the address lines in the monitor bus and having outputs connected to the first and second registers, a pointer flip-flop being actuated to alternate states by signals on the address valid line, means respectively connecting the outputs of the pointer flip-flop to the first and second input gates to enable them to receive a current address on the monitor bus, first and second output gates having inputs respectively connected to outputs of the first and second registers, and being respectively conditioned by the respective outputs of the pointer flip-flop and both being conditioned by each capture signal, and whereby one of the first and second output gates is actuated to select the instruction address in either the first or second register corresponding to the event causing the capture signal.

13. A monitor for obtaining software/hardware interrelationships as defined in claim 12, further comprising:

a capture busy flip-flop being set to busy state by each capture signal and being reset when outgating is completed for the capture register means, a capture overrun counter, means for incrementing the capture overrun counter with any capture signal occurring while the capture busy flip-flop is set to busy state, whereby the content of the capture overrun counter indicates the number of capture signals occurring which did not cause a capture operation by the capture register means due to it being busy with a prior capture signal.

14. A monitor for obtaining software/hardware interrelationships as defined in claim 2, further comprising:

a capture bistable circuit being set by the capture signal, a plurality of output connections from the capture bistable circuit, each output connection providing the capture signal of the monitor, one of the output connections providing the capture signal for the capture register means in the same monitor, each other output connection being available for connection to another monitor connected to another processor in the data processing system, whereby the plurality of output connections can control simultaneous capture in plural monitors of interrelated events occurring in plural processors in the system.

15. A monitor for obtaining software/hardware interrelationships as defined in claim 14, further comprising:

an external input to the event capture switch being connectable to an output connection of another monitor which is monitoring another processor in the system, the presetting means being set to select the external input as the output of the event capture switch, means for bypassing the sampling counter means for connecting trigger signals to the capture bistable circuit, wherein each trigger signal generates a capture signal, whereby an event in a local processor being monitored can be captured by its monitor in relation to an external signal from another monitor in a multiprocessing system providing a capture signal due to a potentially related event in another processor in the system, wherein the existence of any interrelationship can be determined by the addresses concurrently captured in both monitors due to the same capture signal being provided to both monitors.

16. A monitor for obtaining software/hardware interrelationships as defined in claim 15, further comprising:

output buffer means in the monitor for receiving a captured content of the capture register means in response to each capture operation, a control processor having a channel connected to the monitor to provide control commands to the monitor, capture signal means for the monitor signalling the control processor upon the occurrence of a capture signal, a readout control command causing readout of the captured content from the output buffer means to the control processor.

17. A monitor for obtaining software/hardware interrelationships as defined in claim 16, further comprising:

a personalization command being provided by the control processor to the monitor to load the personalization register with data defining the event to control the capture operation and any additional event to be included in a capture operation.

18. A monitoring arrangement for obtaining measurement data on the software/hardware operation of a data processing system having plural processors and a shared main storage, each processor having an instruction unit with an instruction address register for indicating the address of each instruction being executed by the processor, the processor having latches for registering the occurrence of events in the processor resulting from its execution of an instruction; comprising:

a plurality of monitors respectively connected to different processors in the multiprocessing system, each monitor comprising:

an event capture switch having a plurality of inputs connected to a set of latches and the instruction address register in an associated processor to be monitored, means for presetting the event capture switch to select one of its inputs (representing a preset type of event) as its output, the occurrence of an output signal from the event capture switch being a trigger signal, capture register means, means for triggering the capture register means upon the occurrence of the trigger signal to register an instruction address provided by the instruction address register to thereby capture the address of the instruction causing the trigger signal, means for cross-connecting the triggering means of a particular monitor in the plurality of monitors to an input of the event capture switch of at least one of the other monitors, and output means for initiating a transfer of the contents of each capture register means of every interconnected monitor for the multiprocessor in a predetermined sequence on an external recording medium in response to each trigger signal in any monitor, whereby a relationship of a software or hardware operation in the processor connected to the other monitor can be determined in relation to a software or hardware operation in the particular monitor by observing the instruction addresses in the related output unit of monitored data.

19. A monitor for obtaining software/hardware interrelationships as defined in claim 18, further comprising:

a cross-interrogate hit latch in the processor connected to the particular monitor providing a cross-interrogate input to the event capture switch, the presetting means selecting the cross-interrogate input as the output of the event capture switch for providing the trigger signal, whereby the address of the instruction causing each cross-interrogate hit is obtained from a related output unit of monitored data.

20. A monitor for obtaining software/hardware interrelationships as defined in claim 18, each monitor for the multiprocessor system further comprising:

sample counter means for outputting an nth count in each monitor for generating a capture signal that enables a capture of a current instruction address in the capture register means upon the occurrence of each nth trigger signal, means for bypassing the sample counter means with each trigger signal being the capture signal when the presetting means selects any input within a given subset of input to the event capture switch, whereby sampling is done for some monitored events but not for other monitored events.

21. A monitor for obtaining software/hardware interrelationships as defined in claim 20, the output means further comprising:

output buffer means in each monitor for receiving a captured content of the capture register means in response to each capture operation in each monitor, a control processor having a channel connected to all monitors for the multiprocessor system to provide control commands to the monitors, capture signal means for any of the monitors to signal the control processor upon the occurrence of a capture signal in any monitor, a readout control command causing readout of the captured content from each output buffer means to the control processor in a predetermined order in response to each capture signal, whereby the current instruction addresses and predetermined events are captured from all processors in the multiprocessor and outputted as a sequential data unit to the control processor whenever any monitor for the multiprocessor system generates a capture signal, so that software/hardware interrelationships in the multiprocessor are obtainable from the outputted data units.

22. A monitor for obtaining software/hardware interrelationships as defined in claim 21, further comprising:

an instruction valid latch means in a particular processor being monitored by the particular monitor, an instruction valid line being connected from the instruction valid latch means to an instruction valid input of the event capture switch in the particular monitor and activating the bypass means, the presetting means selecting the instruction valid input as the output of the event capture switch in the particular monitor in order for the capture register means in the particular monitor to capture each instruction address in the particular processor, whereby the trigger means initiates the capture of concurrent addresses in the instruction streams of the processors in the multiprocessor.

* * * * *